(12) United States Patent
Michelon

(10) Patent No.: US 10,191,483 B2
(45) Date of Patent: *Jan. 29, 2019

(54) METHOD AND DEVICE FOR MODIFYING A DEVICE FOR CLEANING A SUBMERGED SURFACE

(71) Applicant: ZODIAC POOL CARE EUROPE, Paris (FR)

(72) Inventor: Thierry Michelon, Toulouse (FR)

(73) Assignee: Zodiac Pool Care Europe, Bron (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/715,513

(22) Filed: Sep. 26, 2017

(65) Prior Publication Data
US 2018/0081333 A1   Mar. 22, 2018

Related U.S. Application Data

(63) Continuation of application No. 14/387,911, filed as application No. PCT/FR2013/050950 on Apr. 29, 2013, now Pat. No. 9,791,840.

(30) Foreign Application Priority Data

Apr. 27, 2012 (FR) ...................... 12 01250

(51) Int. Cl.
*G05D 1/00* (2006.01)
*E04H 4/16* (2006.01)

(52) U.S. Cl.
CPC ......... *G05D 1/0022* (2013.01); *E04H 4/1654* (2013.01); *G05D 2201/0203* (2013.01); *Y10S 901/01* (2013.01)

(58) Field of Classification Search
CPC .......... Y10S 901/01; G05D 2201/0203; E04H 4/1654
See application file for complete search history.

(56) References Cited

U.S. PATENT DOCUMENTS

| 5,569,371 A | 10/1996 | Perling |
| 7,062,221 B1 | 6/2006 | Christensen |

(Continued)

FOREIGN PATENT DOCUMENTS

| EP | 0169589 | 1/1986 |
| EP | 1122382 | 8/2001 |

(Continued)

OTHER PUBLICATIONS

Australian Patent Application No. 2013254462, First Examiner Report, dated May 3, 2016, 3 pages.

(Continued)

*Primary Examiner* — Dale Moyer
(74) *Attorney, Agent, or Firm* — Kilpatrick Townsend & Stockton LLP; Dean W. Russell

(57) ABSTRACT

The invention relates to a method and device for modifying a device for cleaning a submerged surface, the device including a cleaning appliance, a control unit suitable for sending control signals to the appliance, characterized in that a modification device is inserted onto the link between the control unit and the appliance, which modification device includes an antenna for receiving wireless request signals and a signal-processing unit for transmitting signals from the control unit to the appliance and, upon receipt of wireless request signals in the receiving antenna, for ignoring signals from the control unit, and producing and transmitting priority control signals to the cleaning appliance.

8 Claims, 2 Drawing Sheets

(56) References Cited

U.S. PATENT DOCUMENTS

| | | |
|---|---|---|
| 2007/0067930 A1 | 3/2007 | Garti |
| 2012/0006352 A1 | 1/2012 | Holappa |
| 2013/0110319 A1 | 5/2013 | Michelon |
| 2014/0263087 A1 | 9/2014 | Renaud |
| 2016/0281380 A1 | 9/2016 | Durvasula |

FOREIGN PATENT DOCUMENTS

| | | | | |
|---|---|---|---|---|
| EP | 1122382 A1 * | 8/2001 | ........... | E04H 4/1654 |
| WO | WO-2004019295 A1 * | 3/2004 | ........... | E04H 4/1654 |

OTHER PUBLICATIONS

International Search Report dated Oct. 2, 2013 in Application No. PCT/FR2013/050950.
French Search Report dated Feb. 2014 in Application No. FR1201250.
IEEE-SA Standards Board, Telecommunications and information exchange between systems, 2003, 77 pages.
U.S. Appl. No. 14/387,911, Non-Final Office Action, dated Feb. 10, 2017, 17 pages.
U.S. Appl. No. 14/387,911, Notice of Allowance, dated Jun. 15, 2017, 6 pages.
European Application No. 13725396.9, Office Action dated Sep. 25, 2017, 11 pages.

\* cited by examiner

METHOD AND DEVICE FOR MODIFYING A DEVICE FOR CLEANING A SUBMERGED SURFACE

CROSS-REFERENCE TO RELATED APPLICATIONS

This application is a continuation of allowed U.S. patent application Ser. No. 14/387,911, filed Sep. 25, 2014, which application is the U.S. national phase of International Application No. PCT/FR2013/050950, filed Apr. 29, 2013, which application claims priority to French Patent Application No. 12/01250, filed Apr. 27, 2012, the contents of all of which applications are incorporated herein by this reference.

FIELD OF THE INVENTION

The invention relates to a method and an associated device for modifying a communication link between a self-propelled appliance for cleaning a surface submerged in liquid and its control module. The invention relates notably to a method and a device making it possible to control the appliance wirelessly. The invention relates also to a cleaning device including a self-propelled submerged surface cleaning appliance, a wired control module for controlling the appliance and said modifying device.

BACKGROUND OF THE INVENTION

The self-propelled submerged surface cleaning appliances, notably the self-propelled electric appliances, are either fully autonomous or, more generally, linked to a control module outside the pool (notably the swimming pool) which supplies them, via a cable, with electric energy and which controls them. Sometimes, such control modules allow a user to remotely control the appliance, notably to drive it over the submerged surface, which can prove useful for removing the appliance from the liquid or for cleaning a specific area of a pool. However, this requires a user to be located in proximity to the pool, at the exact point where the control module is installed.

Means for remotely controlling a submerged surface cleaning appliance (or swimming pool robot) have moreover already been proposed. Thus, for example, U.S. Pat. No. 5,569,371 is known, which proposes a remote control making it possible to control the movements of the appliance. Similarly, EP 1 122 382 is known, which proposes a swimming pool cleaning appliance linked to a floating control unit adapted to receive wireless control signals and transmit them by wire to the swimming pool cleaning appliance.

However, in each case, to be able to exploit remote control, notably wireless, and more particularly via a wireless remote control unit, the user has to purchase a new, compatible control module, that is to say one that is adapted to receive and transmit wireless signals. This represents a significant cost for the user who then has to replace a control module that is still in working order.

SUMMARY OF THE INVENTION

The invention therefore aims to mitigate these drawbacks.
The invention aims to propose a method and a device for modifying a submerged surface cleaning device, notably a communication link between a control module and a self-propelled submerged surface cleaning appliance.

The invention aims in particular to propose a modifying method and device making it possible to wirelessly control an appliance which was originally not designed to be able to be so controlled.

The invention also aims to propose such a device which is simple to install on an existing wired link between a control module and an appliance.

The invention aims notably to propose such a device which is installed alone and requires no computer intervention—notably software installation, configuration or programming—on the part of the user.

The invention further aims to propose such a device which is compatible with all types of remote control units, notably with consumer electronic appliances such as cell phones, laptops, touch tablets, etc.

The invention therefore relates to a method for modifying a device for cleaning a submerged surface in which a cleaning device is chosen comprising:
    a cleaning appliance for a submerged surface comprising at least one electronic unit,
    a control module:
        linked directly or indirectly by a link with the electronic unit of the appliance,
        adapted to be able to generate and send control signals to the electronic unit of the appliance via said link,
    characterized in that a device, called modifying device, is chosen and inserted, on the link between the control module and the appliance, comprising:
    an antenna adapted to be able to at least receive signals, called request signals, wirelessly,
    a signal processing unit electrically linked to the antenna, and adapted to be able to:
        transmit control signals received from the control module to the appliance via said link,
        on reception of wireless request signals by the antenna:
            not transmit at least some of the control signals (18) received from the control module,
            generate signals, called priority signals, to control the appliance,
            transmit said priority signals to the appliance via said link.

Advantageously, in a method according to the invention, the electronic unit is embedded on board the appliance, and
the control module is linked only by a wired link with the electronic unit of the appliance.

The invention therefore relates to a method for modifying a device for cleaning a submerged surface in which a cleaning device is chosen comprising:
    a cleaning appliance for a submerged surface comprising at least one embedded electronic unit,
    a control module:
        linked only by a wired link with the embedded electronic unit of the appliance,
        adapted to be able to generate and send control signals to the embedded electronic unit of the appliance via said wired link,
    characterized in that a device, called modifying device, is chosen and inserted, on the wired link between the control module and the appliance, comprising:
    an antenna adapted to be able to at least receive signals, called request signals, wirelessly,
    a signal processing unit electrically linked to the antenna, and adapted to be able to:
        transmit control signals received from the control module to the appliance via said wired link,
        on reception of wireless request signals by the antenna:

not transmit at least some of the control signals received from the control module, generate signals, called priority signals, to control the appliance, transmit said priority signals to the appliance via said wired link.

In such a method, the human intervention is very limited: all that is required is to insert a modifying device according to the invention on a wired link between a submerged surface cleaning appliance and its control module, said control module being free of any wireless communication link, to be able to send wireless commands to the appliance.

This is why, advantageously and according to the invention, a modifying device is chosen that comprises:

a first electrical connector, called upstream connector, adapted to be able to be electrically connected with a control module, a second electrical connector, called downstream connector, adapted to be able to be electrically connected with a self-propelled submerged surface cleaning appliance.

The invention therefore relates also to a device for modifying a device for cleaning a submerged surface comprising a self-propelled submerged surface cleaning appliance and at least one control module for said appliance linked directly or indirectly to said appliance by a link, said modifying device being adapted to be able to be inserted on said link and comprising:

an antenna adapted to be able to at least receive signals, called request signals, wirelessly, a signal processing unit electrically linked to the antenna, and adapted to be able to:

transmit control signals received from the control module to the appliance via said link, on reception of wireless request signals by the antenna:

not transmit at least some of the control signals received from the control module, generate signals, called priority signals, to control the appliance, transmit said priority signals to the appliance via said link.

Advantageously and according to the invention, the control module of said appliance is linked to said appliance only by a wired link.

The invention therefore relates to a device for modifying a device for cleaning a submerged surface comprising a self-propelled submerged surface cleaning appliance and at least one control module for said appliance linked to said appliance only by a wired link, said modifying device being adapted to be able to be inserted on said wired link and comprising:

an antenna adapted to be able to at least receive signals, called request signals, wirelessly, a signal processing unit electrically linked to the antenna, and adapted to be able to:

transmit control signals received from the control module to the appliance via said wired link, on reception of wireless request signals by the antenna:

not transmit at least some of the control signals received from the control module, generate signals, called priority signals, to control the appliance, transmit said priority signals to the appliance via said wired link.

The invention thus makes it possible to add communication functionality, via a wireless link, to a submerged surface cleaning device which was not specifically designed for such capability when it was manufactured.

Thus, the modifying device according to the invention makes it possible to use a wireless remote control unit or a remote automatic unit to send wireless commands and notably to drive the appliance.

A modifying device according to the invention is in particular provided to be able to be inserted on a wired communication link between an appliance and a control module for said appliance, notably for older generation appliances and control modules that do not have wireless communication means.

From request signals received wirelessly, the signal processing unit of the modifying device according to the invention generates control signals, called priority signals, because they are sent as priority to the embedded electronic unit of the appliance with priority over the control signals transmitted—possibly simultaneously—by the control module to the appliance and blocked by the signal processing unit of the modifying device according to the invention.

More particularly, the signal processing unit is advantageously adapted to, on reception of wireless request signals by the antenna, transmit none of said control signals received from the control module.

In particular, advantageously and according to the invention, furthermore:

a first electrical connector, called upstream connector, adapted to be able to be electrically connected with a control module, a second electrical connector, called downstream connector, adapted to be able to be electrically connected with a self-propelled submerged surface cleaning appliance.

In practice, the self-propelled appliances generally have a power-supply and control cable terminated by a connector adapted to be able to be connected to a cooperating connector of a control module of the appliance.

By virtue of its upstream and downstream connectors, the device according to the invention can be inserted between the connector, called receiving connector, of the appliance and the connector, called transmitting connector, of the control module.

A device according to the invention therefore enables the user who is the owner of an old control module to avoid purchasing a new control module including a function for receiving wireless signal transmissions.

Furthermore, a device according to the invention advantageously comprises at least one input/output interface arranged between the signal processing unit and the upstream and downstream connectors.

The input/output interface provides an interface between the signals received from and transmitted to the control module by the signal processing unit of the device according to the invention, and between the signals received from and transmitted to the appliance by the signal processing unit of the device according to the invention. This is why, advantageously, the modifying device according to the invention can also comprise a first input/output interface inserted on a wired link between a control module and the signal processing unit of the device according to the invention, and a second input/output interface inserted on a wired link between an appliance and the signal processing unit of the device according to the invention.

Furthermore, a device according to the invention advantageously further comprises at least one memory containing logic data, called reprogramming data, representative of instructions for reprogramming a control module.

Furthermore, advantageously and according to the invention, the signal processing unit is adapted to, upon connection of a control module to the upstream connector, transmit said reprogramming data to said control module via the upstream connector.

In particular, advantageously and according to the invention, the signal processing unit is adapted to, when it is connected for the first time to a compatible control module, send to the control module predetermined signals, on reception of which the control module undertakes a reinitialization procedure. The signal processing unit is adapted to then send the programming signals to the control module.

The simple electrical connection of a device according to the invention therefore allows for the automatic reprogramming—that is to say without the intervention of a human user—of the control module to make it compatible with the device according to the invention.

Thus, the installation of a device according to the invention does not require any knowledge in computing, in particular any computer intervention (programming, installation, configuration, etc.) on the part of the user.

The memory or memories of a device according to the invention therefore comprises/comprise a sufficient storage space to store logic data representative of operating instructions for the device according to the invention, and reprogramming data for the control module.

At least one memory is advantageously a non-volatile non-writable memory (or read-only memory), that is to say a persistent memory even if the power supply for said device is cut, for example of EEPROM type.

From a program stored in a non-volatile memory (for example of FLASH type), the signal processing unit processes the signals received on the upstream connector or on the downstream connector and transmits electronic signals to the control module or the appliance respectively via the upstream connector or via the downstream connector.

Advantageously and according to the invention, the modifying device according to the invention comprises a microcontroller. This microcontroller handles the signal processing unit and memory functions—at least two memories for storing instructions for the signal processing unit.

Advantageously, a device according to the invention is also characterized in that it further comprises, between the upstream connector and the downstream connector, at least one electrical power supply wire, and in that the upstream connector and the downstream connector each have an electrical plug linked electrically to said electrical power supply wire.

Thus, when the control module is linked by a cable to the appliance, said cable generally comprises two electrical power supply wires and one data communication wire. There is nothing, however, to prevent the electrical power supply wires, when the power supply is by alternating current, from being used as power line data communication wires.

The device according to the invention thus allows for the transmission of the electrical power supply supplied by the control module to the appliance.

A device according to the invention can for example take the form of a cable section terminated by a downstream connector at a first end and an upstream connector at its second end. The device according to the invention takes the form of a cable section also equipped with a small shell comprising the signal processing unit, the antenna, at least one memory, and the input/output interface(s). It is therefore advantageously lighter and less costly than a complete control module.

Furthermore, the shell containing the signal processing unit, the antenna, at least one memory, and the input/output interface is advantageously and according to the invention a watertight shell. The shell thus protects the electronic equipment of the modifying device according to the invention from sprayed water or rain, commonplace in proximity to a pool, notably an outdoor swimming pool.

Moreover, advantageously and according to the invention,
the antenna is adapted to be able to transmit wireless signals,
the signal processing unit is adapted to be able to:
receive, from the appliance, signals containing data, called status data, relating to said appliance or to its environment,
generate signals, called status signals, from said status data,
wirelessly transmit status signals via the antenna.

Thus, a user of an appliance on which a device according to the invention is mounted can recover data, called status data, concerning the appliance or its environment on a wireless remote control unit. For example, status data can be representative of information relating to the appliance or to its environment such as: the temperature or the pH of the water in which the appliance is moving, an itinerary traveled over the submerged surface(s), an error message or a log of errors encountered by the appliance, the status of its batteries when the appliance is autonomous, etc.

In particular, advantageously and according to the invention, the signal processing unit is adapted to be able to analyze and recognize predetermined request signals received via the antenna and representative of a request for information concerning the appliance and/or its environment, and to be able to generate and transmit priority control signals representative of a status data request to the appliance. The signal processing unit is adapted to be able to then receive, via the wired link, status data sent by the embedded electronic unit of the appliance, to be able to analyze and prepare them then wirelessly send, via the antenna, status signals containing the information represented by said received status data.

The information contained in the status signals can be advantageously displayed on a remote control unit (notably when the remote control unit is a digital appliance provided with a screen), or on a remote programmable station.

A device according to the invention is adapted to be able to receive wireless request signals for example from a remote control unit or from a remote programmable station. A fixed programmable station is in fact sometimes installed in a housing in proximity to an outdoor pool, in order to enable the user to control his or her appliance from its housing without having to go out, for example, to go to a technical room.

Advantageously, a device according to the invention further comprises a remote control unit, adapted to be able to send wireless request signals.

Such a remote control unit can, for example, be supplied with the modifying device according to the invention and be dedicated to this use.

Alternatively, any programmable device that can transmit wireless signals in the range of frequencies within which the antenna of the device according to the invention is adapted to be able to operate, can be used as remote control unit.

Advantageously, a remote control unit according to the invention comprises a screen adapted to be able to display information relating to the appliance and/or to its environment received by status signals.

Furthermore, the remote control unit advantageously comprises buttons—physical or simulated on a touchscreen—triggering the sending of the request signals by the remote control unit.

In particular, mobile appliances such as cell phones, laptops, digital tablets, etc. can be programmed with a computer program enabling them to generate request signals in accordance with the invention and thus be able to operate as remote control unit of an appliance via the device according to the invention.

This is why, advantageously, the invention also extends to a computer program comprising computer code instructions to enable a computer terminal such as a cell phone or a computer to be used as remote control unit of the device according to the invention when said computer program is loaded and run on said terminal.

This is why, advantageously and according to the invention, the signal processing unit and the antenna are adapted to transmit and receive wireless signals in a radio frequency domain and according to a protocol conforming to a Wi-Fi® standard.

With the Wi-Fi® standards being very widely accepted and used by numerous domestic and consumer appliances, the modifying device according to the invention is thus compatible with a large number of appliances available to a user—in particular appliances that can be programmed by a computer program (or software) according to the invention.

The antenna is therefore advantageously adapted to transmit and receive in a frequency band lying between 2.4 GHz and 2.5 GHz. The signal processing unit is advantageously adapted to be able to process and generate signals according to a protocol of Wi-Fi® type.

Similarly, the signal processing unit and the antenna can advantageously be adapted to be able to transmit and receive wireless signals in another radio frequency domain and according to another protocol conforming to a standard, for example of the Bluetooth®, Zigbee®, etc. type.

The invention extends also to a device for cleaning a submerged surface comprising at least:
- a submerged surface cleaning appliance comprising at least one embedded electronic unit,
- a control module:
    - adapted to be able to be linked only by a wired link with the embedded electronic unit of the appliance,
    - adapted to be able to generate and send control signals to the embedded electronic unit of the appliance via said wired link,
    - a modifying device according to the invention.

In particular, the self-propelled submerged surface cleaning appliance further comprises at least one embedded communication interface, electrically linked to the embedded electronic unit, and an electrical connector, called receiving connector, electrically linked to the communication interface is adapted to be able to be connected to a connector, called transmitting connector, of a control module.

Such a cleaning device makes it possible to provide all of the appliance and its control system (control module and device for modifying a communication link according to the invention between the control module and the appliance). This makes it possible in particular, without modifying the control module production line, to enable the appliance to be controlled wirelessly by a remote control unit or a remote programmable station.

Advantageously, a cleaning device according to the invention further comprises a remote control unit, adapted to be able to send wireless request signals to the antenna of the modifying device.

A cleaning device according to the invention can also comprise means for storing digital data representative of a computer program intended to be installed on a computer appliance to be able to operate it as a remote control unit or a remote programmable station.

The invention also relates to a method for wirelessly controlling a swimming pool cleaning appliance using a modifying device, comprising:
a) the wireless transmission of request signals to the modifying device, the request signals relating to the control of the swimming pool cleaning appliance, and
b) the wireless transmission of status signals by the modifying device, the status signals relating to the swimming pool cleaning appliance or to its environment in a swimming pool.

Such a method further advantageously comprises the transmission of control signals from a control module to the modifying device.

Advantageously, such a method further comprises the processing of request signals received wirelessly by the modifying device and the generation of priority signals for transmission to the swimming pool cleaning appliance.

Advantageously, such a method according to the invention further comprises the non-transmission of the control signals to the swimming pool cleaning appliance when priority signals are transmitted to the swimming pool cleaning appliance.

Advantageously, such a method according to the invention further comprises the transmission of status signals from the swimming pool cleaning appliance to the modifying device.

Advantageously, such a method according to the invention further comprises the use of a remote control unit to transmit the request signals to the modifying device.

Advantageously, such a method according to the invention further comprises the use of a remote control unit to transmit the request signals to the modifying device according to a protocol conforming to a standard of the Wi-Fi®, Bluetooth®, or Zigbee® type.

The invention relates also to a method for modifying a submerged surface cleaning device, notably a communication link for said cleaning device, jointly characterized by all or some of the features mentioned above or below.

The invention relates also to a device for modifying a submerged surface cleaning device, notably a communication link of said cleaning device, jointly characterized by all or some of the features mentioned above or below.

The invention relates also to a submerged surface cleaning device jointly characterized by all or some of the features mentioned above or below.

The invention relates also to a method for wirelessly controlling a swimming pool cleaning appliance jointly characterized by all or some of the features mentioned above or below.

BRIEF DESCRIPTION OF THE DRAWINGS

Other aims, features and advantages of the invention will become apparent on reading the following description given as a nonlimiting example and which refers to the attached figures in which.

DETAILED DESCRIPTION

A device 1 for modifying a communication link according to the invention is advantageously adapted to be able to be added to an existing communication link between a submerged surface 23 cleaning appliance 3 and a control module 2 for said appliance.

Figure 1:
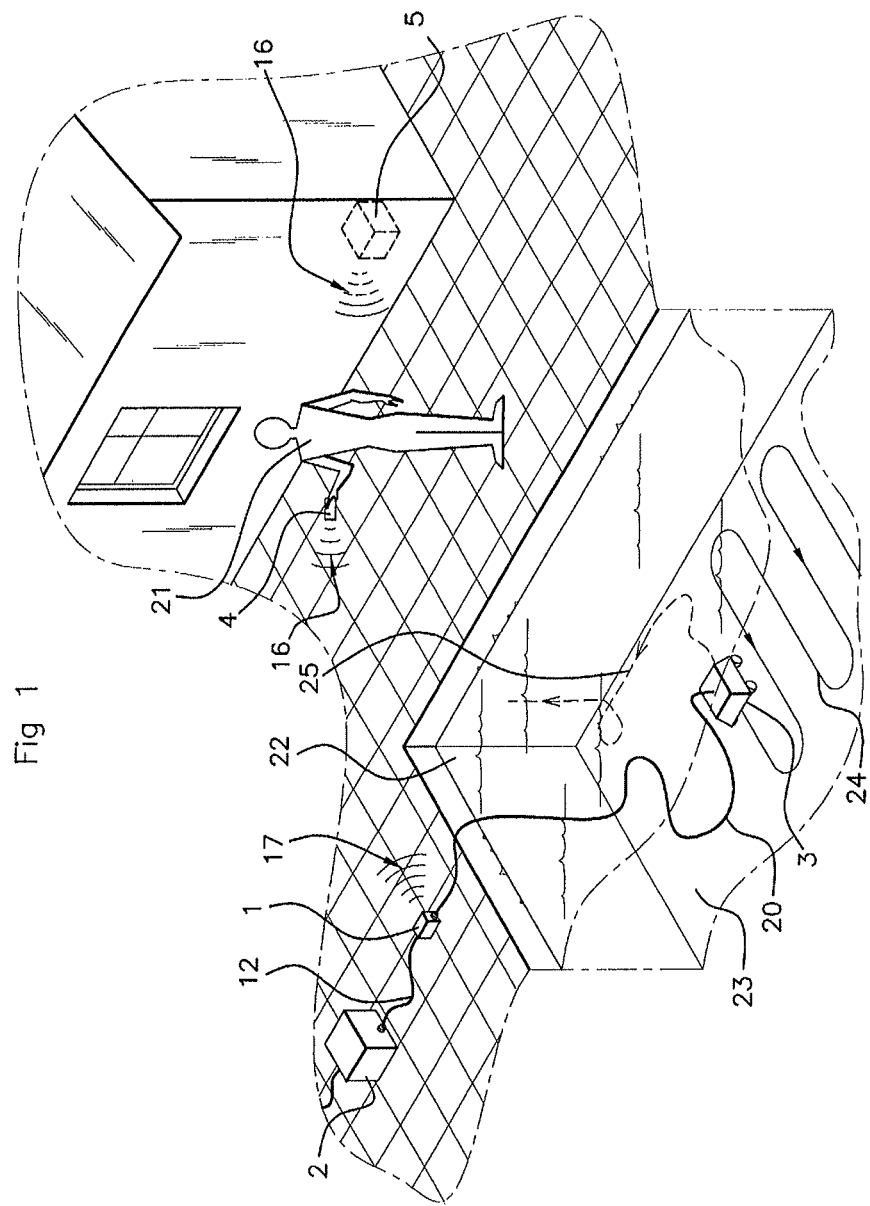
FIG. 1 is a schematic representation conforming to the invention of a submerged surface cleaning device according to the invention on which a modifying device according to the invention has been inserted between a control module and a submerged surface cleaning appliance according to a method in accordance with the invention.

As represented in FIG. 1, the submerged surface cleaning appliance 3 travels over a submerged surface 23 of a swimming pool 22. The appliance 3 is linked to a control module 2 by a wired link in the form of a cable 20 making it possible to transmit control signals 18 and an electrical power supply to said appliance 3—notably by virtue of a two-wire electrical power link 19. It is on this cable 20 that a modifying device 1 according to the invention can be inserted.

In practice, the control module 2 comprises a connector, called transmitting connector 14, adapted to be able to cooperate in such a way as to create an electrical link with a connector, called receiving connector 13, electrically linked to the appliance 3.

Figure 2:
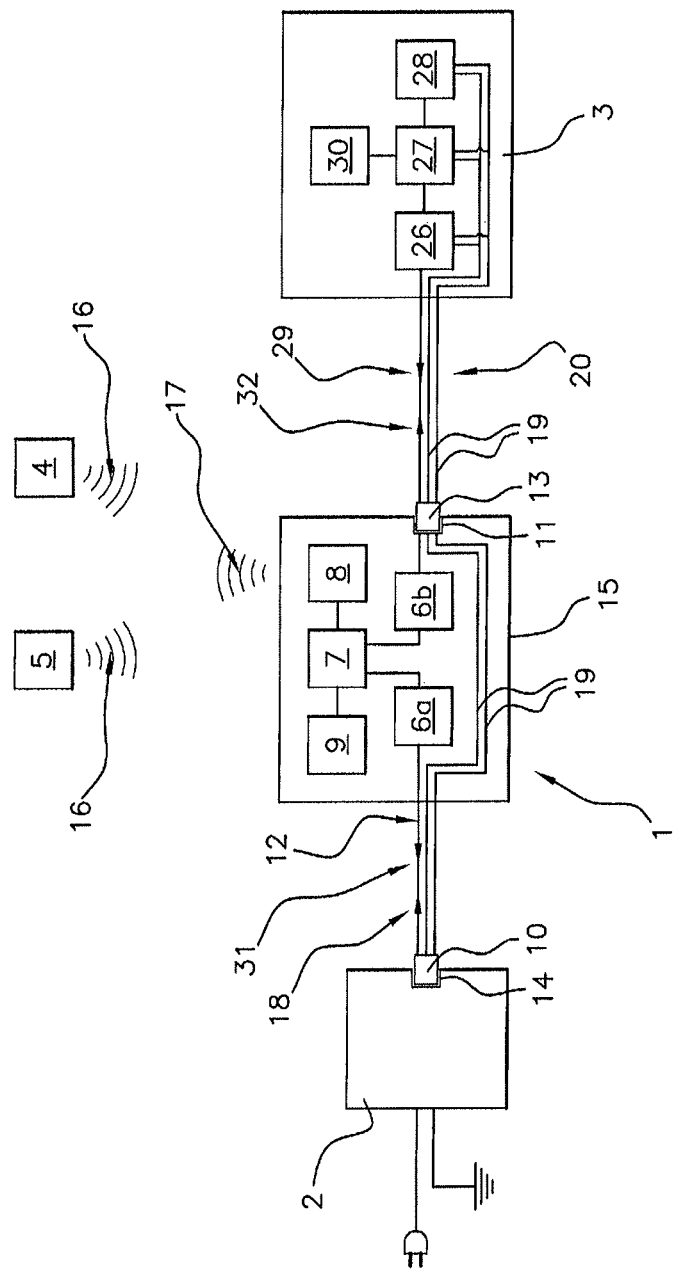
FIG. 2 is a functional block diagram of the submerged surface cleaning device according to the invention, comprising a modifying device according to the invention, in accordance with FIG. 1.

A modifying device 1 according to the invention therefore comprises a connector, called upstream connector 10, of the same type—notably of the same form—as the receiving connector 13, adapted to be able to cooperate with said transmitting connector 14, and a connector, called downstream connector 11, of the same type—notably of the same form—as the transmitting connector 14 adapted to be able to cooperate with said receiving connector 13, to be able to be inserted on the communication link between the control module 2 and the appliance 3. Thus, as represented in FIG. 2, the transmitting connector 14 of the control module 2 is a female connector, the upstream connector 10 is a male connector, the downstream connector 11 is a female connector, and the receiving connector 13 is a male connector.

In a first step of a method according to the invention, the receiving connector 13 is disconnected from the transmitting connector 14. In a second step of a method according to the invention, the upstream connector 10 of the modifying device 1 is connected to the transmitting connector 14 of the control module 2. In a third step of a method according to the invention, following, preceding or concurrent with the second step, the downstream connector 11 of the modifying device 1 is connected to the receiving connector 13 of the appliance. In a fourth step, the user is inactive, and the modifying device 1 automatically reprograms the control module 2. In a fifth step, optional and that can take place at any time before, during or after the other steps of the method, a computer program is installed by the user on a computing device, notably a mobile device, of the user in order to enable said computing device to operate as a remote control unit 14.

A modifying device 1 according to the invention can have a cable section 12 between the upstream connector 10 and the downstream connector 11, on which a watertight shell 15 is inserted.

The portion of cable 12 is optional, the upstream 10 and downstream 11 connectors could be directly incorporated in the watertight shell 15. However, an appliance 3 generally has a cable of significant length terminated by a receiving connector 13 adapted to be able to be connected to a transmitting connector 14 of a control module 2, said transmitting connector being incorporated in the specific shell of the control module 2. This is why the modifying device 1 as represented in FIGS. 1 to 3 has a cable section 12 between an upstream connector 10 and the shell 15 and has a downstream connector 11 emerging directly from the shell 15.

Said watertight shell 15 contains two input/output communication interfaces 6a, 6b respectively with the control module 2 via the upstream connector 10 and with the appliance 3 via the downstream connector 11—notably with an embedded communication interface 26 on board the appliance 3. The embedded communication interface 26 on board the appliance 3 is advantageously linked to an embedded electronic unit 27 adapted to be able to interpret control signals 18 and priority control signals 32 and convert them into commands for a device 28 for driving and guiding the appliance 3 over a submerged surface 23.

As represented in FIGS. 2 and 3, the shell 15 further comprises a signal processing unit 7, a non-volatile memory 9 and an antenna 8. Said signal processing unit 7 is linked to the input/output communication interfaces 6a, 6b, to the non-volatile memory 9 and to the antenna 8. The signal processing unit 7 and the memory 9 are advantageously included in a microcontroller.

The antenna 8 is adapted to be able to transmit and receive electromagnetic signals in a frequency band lying between one and three GHz, notably between 2.4 and 2.5 GHz, in accordance with a Wi-Fi® protocol.

The memory 9 is adapted to be able to store logic data, called reprogramming data, representative of instructions for reprogramming the control module 2, and logic data representative of instructions for the operation of the modifying device 1 according to the invention, notably for the signal processing unit 7.

In particular, at least some of said logic data stored in the memory 9 allows the signal processing unit 7:
  to generate signals, called status signals 17, from status data 29 received from the appliance 3 via the downstream connector 11 and the input/output communication interface 6b, then transmit them wirelessly via the antenna 8 according to a protocol conforming to the Wi-Fi® standard,
  to interpret signals, called request signals 16, received wirelessly via the antenna 8 according to a protocol conforming to the Wi-Fi® standard, then generate priority control signals 32 and transmit them via the input/output communication interface 6b and the downstream connector 11 to the appliance 3,
  to interrupt the control signal 18 communication link between the control module 2 and the appliance 3 on reception of request signals 16 by disregarding any control signal received from the control module 2,
  upon the connection of the modifying device 1 to a control module 2 via the upstream connector 10, to send reprogramming data 31 to said control module 2.

In particular, the signal processing unit 7 disregards and does not transmit any control signal 18 received from the control module 2 (via its upstream connector 10) as soon as it recognizes the frame of a request signal 16, and for a predetermined duration from the end of reception of a request signal 16.

Request signals 16 can be transmitted by any type of devices, for example a remote control unit 4 manipulated by a user 21, or a remote programmable station 5.

A user 21 can therefore take control with priority over the control module 2 concerning the control of the appliance 3, notably concerning the control of the driving and guiding the appliance on the submerged surface 23. Thus, as represented in FIG. 1, the appliance 3 was following a trajectory 24 determined by a determined cleaning program stored in a memory of the control module 2 until the modifying device 1 according to the invention receives a request message 16 transmitted by a remote control unit 4 manipulated by a user 21. At that point, the user 21 controls the appliance 3 and can for example guide it along a free trajectory 25.

The request signals 16 are therefore advantageously signals for driving the appliance 3, that is to say guidance and speed of movement (forward, reverse, speed, etc.) signals. The request signals 16 can also be signals representative of a request to obtain data or information relating to the appliance and/or to its environment. Thus, the appliance 3 can be equipped with a thermometer 30 linked to the embedded electronic unit 27 which, on request from the signal processing unit 7 of the modifying device 1 via a control signal 18, prepares and sends status data 29 representative of a temperature measured by the thermometer 30 to the signal processing unit 7. On receipt of such status data 29, the signal processing unit 7 generates and wirelessly transmits via the antenna 8 a status message 17 to, for example, a remote control unit 4 adapted to display the temperature measured by the thermometer 30 to a user 21.

The remote control unit 4 is therefore advantageously a mobile computing device provided with a screen. The remote control unit 4 is, for example, a cell phone on which a computer program (or software, or software application) has been installed so as to render the cell phone compatible with the modifying device 1 according to the invention. Said computer program notably makes it possible to make the cell phone capable of generating request signals 16 on pressing physical or touch buttons, and of interpreting status signals 17 to display the information that they contain to a user 21.

Said computer program is in particular adapted to be able to make use of data from an accelerometer of the cell phone and convert them into request signals representative of commands for driving the appliance 3. Said computer program is also advantageously adapted to provide a user 21 with a specific interface for controlling the appliance 3 and displaying information relating to the appliance 3 and to its environment—notably the water in which it is submerged.

The signal processing unit 7 is adapted to be able, after the upstream connector 10 has been connected with a control module 2, to detect a control signal sent by the control module to the appliance, notably a signal ordering the switching-on of the control module. Upon a detection, the signal processing unit 7 determines whether the operating instructions of the control module are compatible with its own operation and, if not, sends reprogramming data 31 containing a reset frame for the control module 2, followed by reprogramming data 31 containing new operating instructions for the control module 2 in order to render it compatible with the modifying device 1 according to the invention.

The modifying device 1 according to the invention therefore makes it possible to multiply the control means for an appliance 3, and more particularly makes it possible to control the appliance 3 using wireless control means, therefore remote control means, for example from a home in proximity to a pool in which the appliance is submerged.

The invention can accommodate numerous other variant embodiments not represented.

Thus, there is nothing to prevent programming the modifying device 1 for it to establish a priority order between a plurality of request signals 16 sent by different devices transmitting such signals, for example between the remote programmable station 5 and the remote control unit 4.

Furthermore, the request signals 16, the control signals 18, the priority signals 32 and the status signals 17 can be of any type, depending for example on the equipment on board a submerged surface cleaning appliance 3. Also, the request signals 16, the priority signals 32 and the control signals 18 are advantageously signals for guiding the appliance or, for example, are representative of a command to return to the surface. However, if the appliance 3 comprises, for example, a water treatment device, the request signals 16, the priority signals 32 and the control signals 18 can be adapted for the embedded electronic unit 27 to give specific commands to said water treatment device. Similarly, the status signals 17 can be representative of information relating to the appliance 3, for example errors or a trajectory followed over the submerged surface and stored in memory for a user to view it, or can be representative of information relating to its environment, for example the temperature of the water or the pH of the water, etc.

Furthermore, upon reception of the request signals 16, the signal processing unit 7 can be programmed to pass on priority control signals 32 by the control module 2 before they are returned to the appliance 3, the signal processing unit 7 then being adapted to allow control signals 18 in return from the control module 2 to pass.

There is also nothing to prevent the data processing unit 7 of the modifying device according to the invention from not totally disregarding the control signals 18 from the control module and generating priority control signals 32 to the appliance from both request signals received wirelessly and control signals from the control module.

The invention claimed is:

1. A system for controlling a self-propelled cleaner of a swimming pool, comprising:
    a. a wired link;
    b. a control module configured to transmit a control signal to the self-propelled cleaner via the wired link; and
    c. a modifying device (i) housed separately from the control module, (ii) electrically connected to the wired link between the control module and the self-propelled cleaner, (iii) configured to receive a wirelessly-transmitted request signal from a wireless transmitter housed separately from the control module, and (iv) upon receipt of the request signal, to interrupt transmission of the control signal and instead transmit a priority signal, based on the request signal, to the self-propelled cleaner via the wired link.

2. A system according to claim 1 in which the modifying device is positioned externally of the swimming pool.

3. A system according to claim 1 further comprising the wireless transmitter configured to transmit the request signal to the modifying device.

4. A system according to claim 1 in which the modifying device comprises first and second communication interfaces, the first communication interface electrically connected to the control module and the second communication interface electrically connected to the self-propelled cleaner.

5. A system according to claim 4 in which the modifying device further comprises a microcontroller comprising a signal processing unit and memory.

6. A system according to claim 5 in which the modifying device further comprises an antenna.

7. A system according to claim 6 in which the modifying device further comprises a watertight shell housing the microcontroller and the antenna.

8. A method of controlling a self-propelled cleaner of a swimming pool, comprising:
   a. interposing a modifying device in a wired electrical link between a control module and the self-propelled cleaner, with the modifying device and the control module being housed separately; and
   b. wirelessly transmitting a request signal from a wireless transmitter housed separately from the control module to the modifying device, receipt of which by the modifying device causes the modifying device to interrupt transmission of a control signal from the control module to the self-propelled cleaner and instead transmit a priority signal, based on the request signal, to the self-propelled cleaner via the wired link.

* * * * *